US011212298B2

United States Patent
Burns et al.

(10) Patent No.: US 11,212,298 B2
(45) Date of Patent: Dec. 28, 2021

(54) AUTOMATED ONBOARDING OF DETECTIONS FOR SECURITY OPERATIONS CENTER MONITORING

(71) Applicant: Microsoft Technology Licensing, LLC, Redmond, WA (US)

(72) Inventors: Dawn A. Burns, Lynnwood, WA (US); Hani Hana Neuvirth, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 201 days.

(21) Appl. No.: 16/375,235

(22) Filed: Apr. 4, 2019

(65) Prior Publication Data

US 2020/0322359 A1    Oct. 8, 2020

(51) Int. Cl.
  *H04L 29/06*    (2006.01)
(52) U.S. Cl.
  CPC ...... *H04L 63/1416* (2013.01); *H04L 63/1433* (2013.01); *H04L 2463/121* (2013.01)
(58) Field of Classification Search
  CPC ............. H04L 63/1416; H04L 63/1433; H04L 2463/121; H04L 63/1408; G06F 3/00; G06F 12/00
  See application file for complete search history.

(56) References Cited

U.S. PATENT DOCUMENTS

| | | | |
|---|---|---|---|
| 9,516,053 B1 * | 12/2016 | Muddu | H04L 63/1433 |
| 10,033,753 B1 | 7/2018 | Islam et al. | |
| 10,715,552 B2 * | 7/2020 | Tsironis | H04L 63/20 |
| 10,873,467 B2 * | 12/2020 | Lim | G06F 16/313 |
| 2002/0053033 A1 * | 5/2002 | Cooper | H04L 41/0681 726/7 |

(Continued)

OTHER PUBLICATIONS

A. Paudice, S. Sarkar and D. Cotroneo, "An Experiment with Conceptual Clustering for the Analysis of Security Alerts," 2014 IEEE International Symposium on Software Reliability Engineering Workshops, Naples, 2014, pp. 335-340, doi: 10.1109/ISSREW.2014.82.*

(Continued)

*Primary Examiner* — Trang T Doan
(74) *Attorney, Agent, or Firm* — Fiala & Weaver P.L.L.C.

(57) ABSTRACT

Methods, systems, apparatuses, and computer program products are provided for evaluating security detections. A detection instance obtainer obtains detection instances from a pool, such as a security detections pool. The detection instances may be obtained for detections that meet a predetermined criterion, such as detections that have not been onboarded or rejected, or detections that have generated detection instances for a threshold time period. The detection may be onboarded or rejected automatically based on a volume thresholder and/or a detection performance evaluator. For instance, the volume thresholder may be configured to automatically onboard the detection if the volume of the detection instances is below a first threshold, and reject the detection if the volume is above a second threshold. The detection performance evaluator may be configured to onboard or reject the detection based on an efficacy of the detection (e.g., based on a true positive rate of the detection instances).

20 Claims, 7 Drawing Sheets

(56) References Cited

U.S. PATENT DOCUMENTS

| | | | |
|---|---|---|---|
| 2015/0163242 A1* | 6/2015 | Laidlaw | H04L 63/1433 |
| | | | 726/22 |
| 2015/0193695 A1* | 7/2015 | Cruz Mota | H04L 63/1425 |
| | | | 706/12 |
| 2016/0156656 A1* | 6/2016 | Boggs | H04L 63/1425 |
| | | | 726/25 |
| 2017/0093902 A1* | 3/2017 | Roundy | H04L 63/1425 |
| 2018/0004948 A1* | 1/2018 | Martin | G06F 21/566 |
| 2018/0300486 A1 | 10/2018 | Adir et al. | |
| 2018/0309772 A1* | 10/2018 | Song | H04L 63/1441 |
| 2018/0351993 A1* | 12/2018 | Lee | H04L 63/0227 |
| 2020/0274894 A1* | 8/2020 | Argoeti | G06F 21/6218 |

OTHER PUBLICATIONS

A. Paudice, S. Sarkar and D. Cotroneo, "An Experiment with Conceptual Clustering for the Analysis of Security Alerts," 2014 IEEE International Symposium on Software Reliability Engineering Workshops, Naples, 2014, pp. 335-340, doi: 10.1109/ISSREW.2014. 82. (Year: 2014).*

"International Search Report and Written Opinion Issued in PCT Application No. PCT/US2020/020587", dated Jun. 9, 2020, 13 Pages.

* cited by examiner

AUTOMATED ONBOARDING OF DETECTIONS FOR SECURITY OPERATIONS CENTER MONITORING

BACKGROUND

Incident management systems provide industry professionals with the ability to view and respond to incident reports, such as security alerts arising from various types of network activity. For instance, in an information technology (IT) setting, security analysts in a Security Operations Center (SOC) may receive security alerts corresponding to a wide range of activities occurring on various systems connected on a cloud-computing network. Analyzing cases generated from such reports in a timely manner is desired as certain incidents may comprise potential cyberthreats to one or more systems. However, resolution of cases in a timely manner has become increasingly difficult due to the increasing number of resources on a network, which may be in the hundreds, thousands, or even greater. The difficulty is further compounded by the increasing number of services or software packages on a network, each of which may generate security alerts (some of which are benign, and some malicious).

For instance, since network attacks are typically dynamic in nature, analysts in SOCs therefore need to respond to such attacks in a dynamic manner (e.g., responding and adapting to new attacks) in a timely fashion. However, if alerts that are onboarded into the incident management system are not representative of actual attacks (e.g., the alerts have a low confidence or relate to "false positives") or are too voluminous, resources may be utilized in an inefficient manner. As a result, it has become increasingly important to ensure that the algorithms that generate such alerts are appropriately onboarded.

Existing techniques, which typically require evaluating security alerts generated by the various algorithms manually, are cumbersome, tedious, and time-consuming, often requiring several engineers (or teams of engineers) to manage a network's security. Furthermore, as the number of resources and services continue to increase on a network, the less scalable such solutions become. In addition, such techniques are prone to errors, such as incorrect resolution of security cases, which may result in security vulnerabilities that become exploited.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for evaluating security detections. A detection instance obtainer obtains detection instances from a pool, such as a security detections pool. The detection instances may be obtained for detections that meet a predetermined criterion, such as detections that have not been onboarded or rejected, or detections that have generated detection instances for a threshold time period. The detection may be onboarded or rejected automatically based on a volume thresholder and/or a detection performance evaluator. For instance, the volume thresholder may be configured to automatically onboard the detection if the volume of the detection instances is below a first threshold, and reject the detection if the volume is above a second threshold. The detection performance evaluator may be configured to onboard or reject the detection based on an efficacy of the detection (e.g., a confidence measure that may be based on a true positive rate of the detection instances).

As a result, detections may be automatically onboarded or rejected based on a volume or efficacy (or a combination thereof) of the detection instances generated by the detection. Where such detections are rejected, the automatic rejection may be accompanied by a notification being transmitted to the author of the detection that may provide, among other things, a reason associated with the rejection. In this manner, the detection may be modified to improve the volume and/or efficacy, thereby improving the overall quality of the detection.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
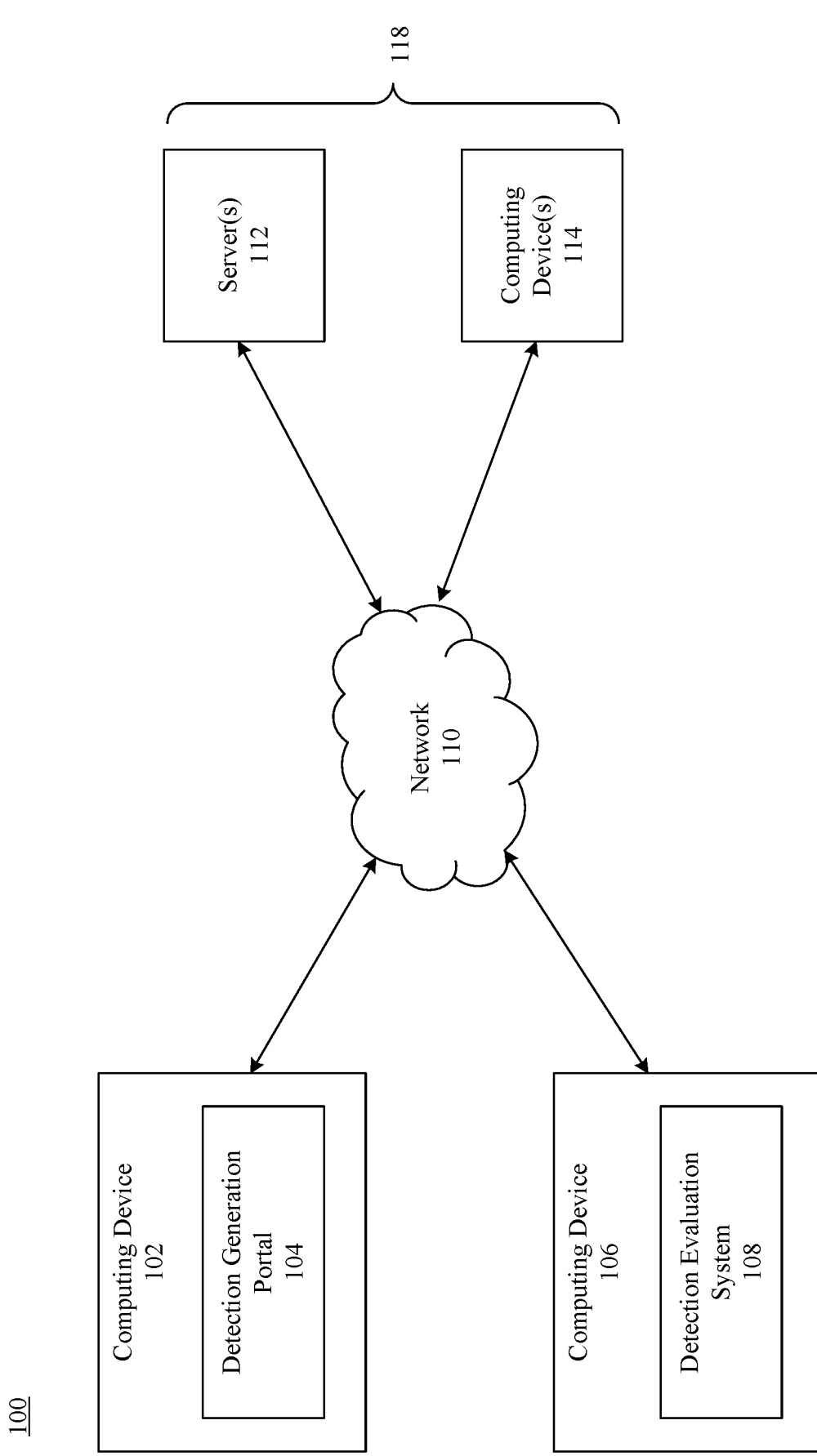
FIG. 1 shows a block diagram of a system for evaluating security detections, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Incident management systems provide industry professionals with the ability to view and respond to incident reports, such as security alerts arising from various types of network activity. For instance, in an information technology (IT) setting, security analysts in a Security Operations Center (SOC) may receive security alerts corresponding to a wide range of activities occurring on various systems connected on a cloud-computing network. Analyzing cases generated from such reports in a timely manner is desired as certain incidents may comprise potential cyberthreats to one or more systems. However, resolution of cases in a timely manner has become increasingly difficult due to the increasing number of resources on a network, which may be in the hundreds, thousands, or even greater. The difficulty is further compounded by the increasing number of services or software packages on a network, each of which may generate security alerts (some of which are benign, and some malicious).

For instance, since network attacks are typically dynamic in nature, analysts in SOCs therefore need to respond to such attacks in a dynamic manner (e.g., responding and adapting to new attacks) in a timely fashion. However, if alerts that are onboarded into the incident management system are not indicative of actual attacks (e.g., the alerts have a low confidence or relate to "false positives") or are too voluminous, resources may be utilized in an inefficient manner. For example, while an algorithm may be designed to detect certain types of activity, the algorithm may also unintentionally generate alerts that are not indicative of attacks, such as where the targeted software or service behaves in a certain manner that causes voluminous alerts, faulty logic in the algorithm, or for any other reason. As a result, it has become increasingly important to ensure that the algorithms that generate such alerts are appropriately onboarded to minimize the number of false positives.

Existing techniques, which typically require evaluating security alerts generated by the various algorithms manually, are cumbersome, tedious, and time-consuming, often requiring several engineers (or teams of engineers) to manage a network's security. Furthermore, as the number of resources and services continue to increase on a network, the less scalable such solutions become. In addition, such techniques are prone to errors, such as incorrect resolution of security cases, which may result in security vulnerabilities that become exploited.

Embodiments described herein address these and other issues by providing a system for evaluating security detections. In the system, detection instances corresponding to a security detection may be obtained from a security detections pool. The detection instances may be obtained for detections that meet a certain criterion, such as detections that have generated detection instances for at least a threshold time period, or detections that have not yet been onboarded or rejected yet. An onboarding determiner is configured to onboard or reject the detection based on a volume of the obtained detection instances, an efficacy of the obtained detection instances, or a combination of volume and efficacy. For instance, a volume thresholder may automatically onboard the detection if a volume of the obtained detection instances is below a first threshold, and automatically reject the detection if the volume is above a second threshold. In instances where the volume is between a first and second threshold, a detection performance evaluator may be configured to onboard or reject the detection based on the efficacy (e.g., a true positive rate) of the detection.

Evaluating security detections in this manner has numerous advantages, including improving the security of a network and resources coupled thereto. For example, techniques described herein ensure that detections meet certain checks or criterion before being onboarded to a security monitoring platform that generates security cases for review by analysts. As a result, detections that generate voluminous detection instances or comprise an insufficient efficacy level need not be onboarded, thereby preserving the resources of the security analysts for evaluating other security cases. Furthermore, techniques described enable detections that do not meet the checks to be rejected, which may include sending a notification to an author of the rejected detection indicating a reason for the rejection. The author may access the rejection and reason for the rejection, and optionally modify the detection algorithm to more accurately detect legitimate security threats. In this manner, detections for abnormal or malicious network activity may be improved, thereby improving both the network and network resources coupled thereto, such as by more efficiently detecting and/or remedying a potential network security breach or attack.

Additionally, the efficiency of one or more computing resources (e.g., servers or other computing devices) herein may also be increased. For instance, by providing safeguards to prevent the onboarding of security detections that are excessively voluminous and/or not indicative of a legitimate threat to a network or coupled resource to a security monitoring platform, the security monitoring platform may conserve various system resources, including but not limited to processing resources, memory and/or storage resources, network resources, etc. that may otherwise be consumed when onboarding detections that are not useful or meaningful. Furthermore, because the number of false positives may be reduced in accordance with the techniques described, the number of cases generated from these types of voluminous and/or inaccurate security detections may be reduced as a result. Such a reduction in the number of security cases for resolution by security analysts may also serve to streamline the resolution process by reducing volume of alerts transmitted and provided to the security analyst, thereby also improving the functioning of such resources as well. Accordingly, the overall system overhead may be reduced, while also improving the security of the network and coupled resources.

Example implementations are described as follows that are directed to a system for evaluating security detections. For instance, FIG. 1 shows a block diagram of an example computing system 100, according to an example embodiment. As shown in FIG. 1, system 100 includes a computing device 102, a computing device 106, one or more server(s) 112, and one or more computing device(s) 114, one or more of which may be communicatively coupled by a network 110. For instance, any of computing device 102, computing device 106, server(s) 112, and/or computing device(s) 114 in FIG. 1 may be communicatively coupled to any other entity shown (or not shown) via network 110. As used herein, network entities 118 comprise the set of network entities of system 100, including but not limited to server(s) 112 and computing devices(s) 114, as well as one or more other network entities not expressly illustrated in FIG. 1 coupled to network 110. As shown in FIG. 1, computing device 102 includes a detection generation portal 104. Computing device 106 includes a detection evaluation system 108. As described in greater detail below, detection generation portal 104 may be configured to provide a portal or other interface through with security detections may be created, viewed, modified, deployed, etc. Detection evaluation system 108 may be configured to evaluate security detections and onboard and/or reject such detections in accordance with implementations described herein. System 100 is further described as follows.

Network 110 may include one or more of any of a local area network (LAN), a wide area network (WAN), a personal area network (PAN), a combination of communication networks, such as the Internet, and/or a virtual network. Computing device 102, computing device 106, and/or network entities 118 may be communicatively coupled to each other via network 110. In an implementation, computing device 102, computing device 106, and/or network entities 118 may communicate via one or more application programming interfaces (API), and/or according to other interfaces and/or techniques.

Computing device 102, computing device 106, network 110, and/or network entities 118 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Server(s) 112 may comprise any server or collection of servers (e.g., a network-accessible server infrastructure) accessible via network 110. Server(s) 112 may comprise, for instance, a cloud computing server network. For example, each of server(s) 112 may comprise a group or collection of servers (e.g., computing devices) that are each accessible by a network such as the Internet (e.g., in a "cloud-based" embodiment) to store, manage, and process data. Each of server(s) 112 may comprise any number of computing devices, and may include any type and number of other resources, including resources that facilitate communications with and between the servers, storage by the servers, etc. (e.g., network switches, storage devices, networks, etc.). Server(s) 112 may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, server(s) 112 may be co-located (e.g., housed in one or more nearby buildings with associated components such as backup power supplies, redundant data communications, environmental controls, etc.) to form a datacenter, or may be arranged in other manners. Accordingly, in an embodiment, server(s) 112 may each be a datacenter in a distributed collection of datacenters.

Each of server(s) 112 may be configured to execute one or more services (including microservices), applications, and/or supporting services. A "supporting service" is a cloud computing service/application configured to manage a set of servers (e.g., a cluster of servers) to operate as network-accessible (e.g., cloud-based) computing resources for users. Examples of supporting services include Microsoft® Azure®, Amazon Web Services™, Google Cloud Platform™, IBM® Smart Cloud, etc. A supporting service may be configured to build, deploy, and manage applications and services on the corresponding set of servers. Each instance of the supporting service may implement and/or manage a set of focused and distinct features or functions on the corresponding server set, including virtual machines, operating systems, application services, storage services, database services, messaging services, etc. Supporting services may be written in any programming language. Each of server(s) 112 may be configured to execute any number of supporting services, including multiple instances of the same supporting service.

Computing device(s) 114 includes the computing devices of users (e.g., individual users, family users, enterprise users, governmental users, etc.) that access server(s) 112 (or any other entity accessible via network 110 shown or not shown expressly in FIG. 1) for cloud computing resources through network 110. Computing device(s) 114 may include any number of computing devices, including tens, hundreds, thousands, millions, or even greater numbers of computing devices. Computing devices of computing device(s) 114 may each be may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device(s) 114 may each interface with server(s) 112 through APIs and/or by other mechanisms. Note that any number of program interfaces may be present. Server(s) 112 and computing device(s) 114 are not limited to processing devices in implementations, and may include other resources on a network, such as storage devices (e.g., physical storage devices, local storage devices, cloud-based storages, hard disk drives, solid state drives, random access memory (RAM) devices, etc.), databases, etc. Though computing device(s) 114 is/are shown separate from server(s) 112, in an embodiment, computing device(s) 114 may be included as node(s) (e.g., virtual nodes) in one or more of server(s) 112.

Computing device 102 may comprise any machine (e.g., a physical machine or a virtual machine, such as a node on a cloud-computing network) for monitoring and/or managing security functions of network 110 and any of network entities 118 connected thereto. For instance, detection generation portal 104 may comprise a graphical user interface or the like enabling a user to view, generate, modify, and/or deploy security detections for network 110 and/or network entities 118. Security detections may include any software, process, algorithm, etc. that may detect certain types of network activity, including but not limited to abnormal network activity, potentially malicious network activity (e.g., internal or external network breaches or attacks), network intrusions, or benign network activity (e.g., normal activity that when combined with other detected network activity may resemble abnormal activity). For example, security detections may be configured to detect instances (potential viruses, malware, phishing attacks, port scanning attacks, brute force attacks, unauthorized installation or execution of a malicious file or code, activities that may compromise sensitive data, or any other indicator of compromise (IOC) or type of attack that may take place on network 110 and/or network entities 118. Examples are not limited to this illustrative list and may include any other type of network activity (e.g., activities that are not determined to comprise network threats) that may be detected on network 110 and/or network entities 118.

In some examples, detection generation portal 104 may comprise a suitable interface for viewing detection instances generated by one or more deployed security detections, such as an identifier of the affected entity (e.g., an Internet-Protocol (IP) address, a Media Access Control (MAC) address, etc.), a geographic location of the affected entity, the type of detected activity, a service or program associated with the detected activity, etc. Detection generation portal 104 may also be configured to receive notifications associated with one or more deployed security detections, as will be described in greater detail below.

Computing device 106 may comprise any machine (e.g., a physical machine or a virtual machine, such as a node on a cloud-computing network) for accessing one or more deployed security detections, such as from a security detections pool, receiving detection instances from such security detections, and/or evaluating such security detections. For instance, detection evaluation system 108 may be configured to determine whether to onboard one or more deployed security detections to a suitable security monitoring platform or reject one or more deployed security detections for various reasons. The security monitoring platform may comprise one or more software packages or programs that may generate one or more security alerts based on onboarded security detections, and/or provide a user interface through which a security analyst or other network engineer may view, investigate, and/or resolve such security alerts. As described in greater detail below, a security detection may be automatically onboarded based on a volume of detection instances generated by the security detection, an efficacy (e.g., a true positive rate) of the detection instances, or a combination thereof. As a result, security detections may be automatically onboarded or rejected in manner consistent with the capabilities and/or preferences of a security operations center, thereby ensuring security alerts may be resolved more efficiently resulting in improved overall network security and reducing an amount of computing resources necessary to manage security cases.

It is noted and understood that implementations are not limited to the illustrative arrangement shown in FIG. 1. Rather, an organization may comprise any number of networks, virtual networks, subnets, machines or virtual machines (or other resources) coupled in any manner. Furthermore, any one or more of computing device 102, computing device 106, and/or network entities 118 may be co-located, may be implemented on a single computing device or virtual machine, or may be implemented on or distributed across one or more additional computing devices or virtual machines not expressly illustrated in FIG. 1.

In some other example embodiments, computing device 102 and/or computing device 106 may be implemented on one or more servers. For instance, such servers may be part of a particular organization or company associated with network 110 or may comprise cloud-based servers configured to provide network monitoring and/or security services for a plurality of organizations. Computing device 102 and/or computing device 106 may include one or more of such server devices and/or other computing devices, co-located or located remote from each other. Furthermore, although FIG. 1 depicts a single computing device 102 and a single computing device 106, it is understood that implementations may comprise any number of such computing devices. An example computing device that may incorporate the functionality of computing device 102, computing device 106, server(s) 112, and computing device(s) 114 is described below in reference to FIG. 7.

Figure 2:
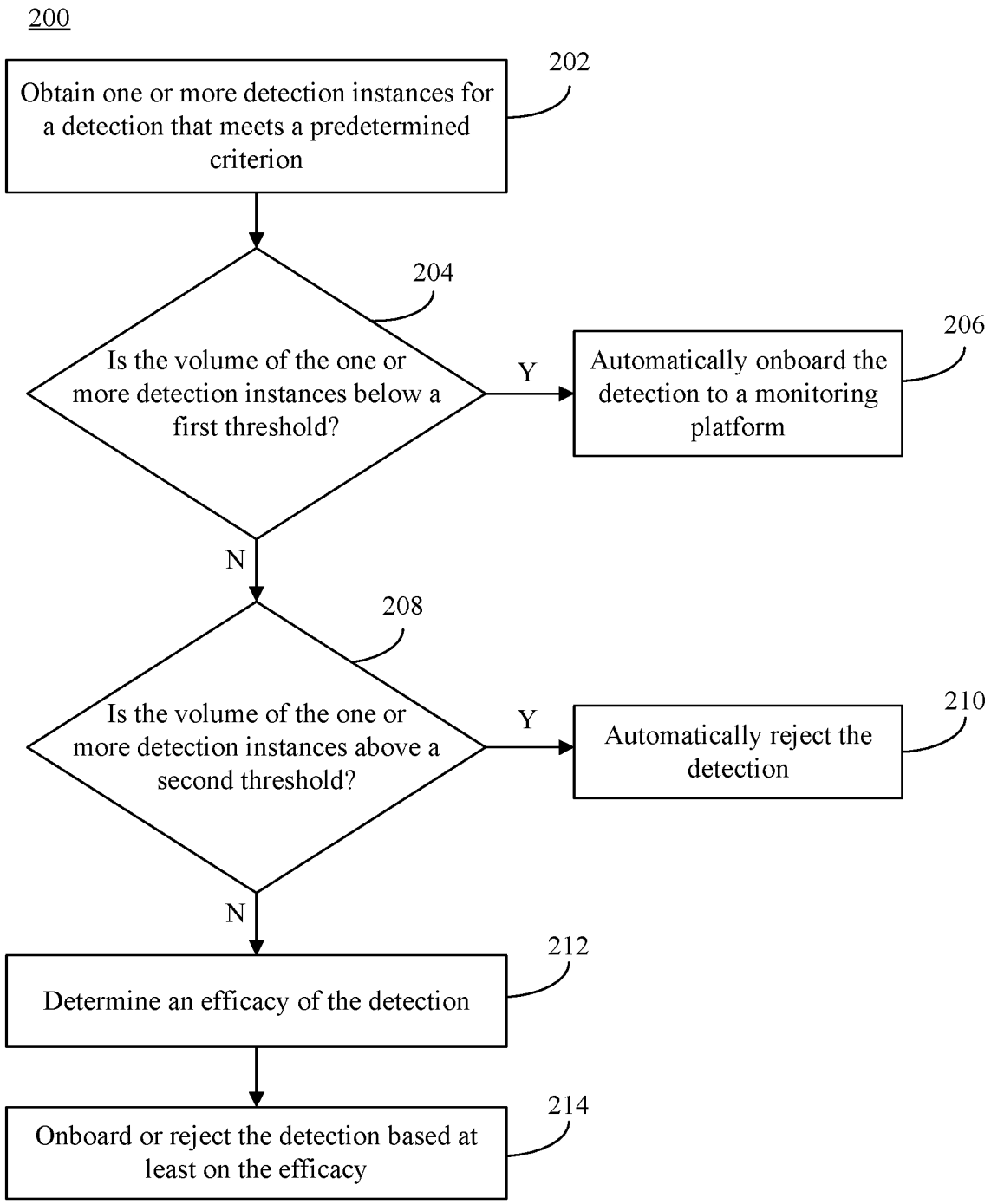
FIG. 2 shows a flowchart of a method for onboarding or rejecting security detections, according to an example embodiment.
Figure 3:
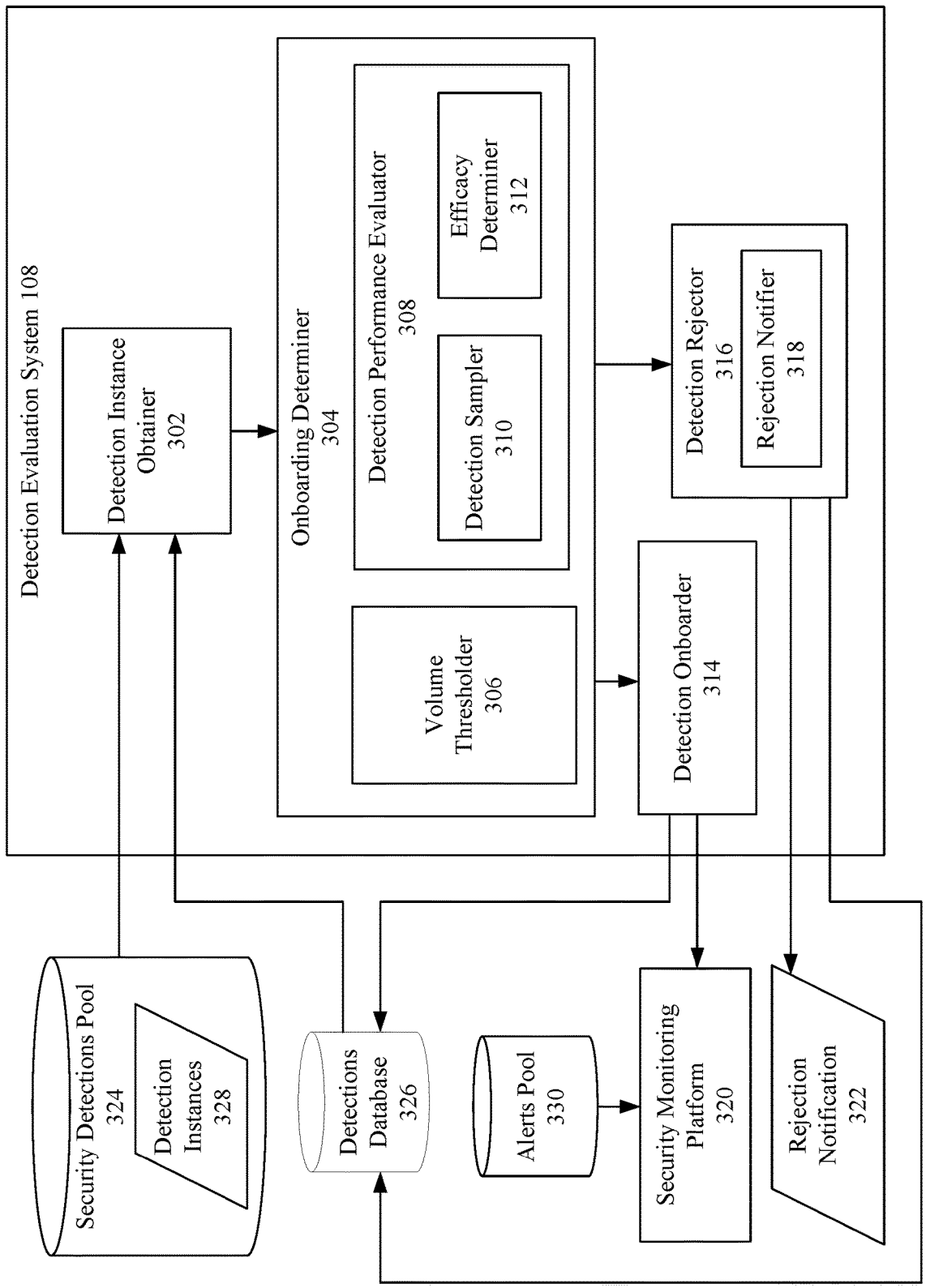
FIG. 3 shows a block diagram of a detection evaluation system, according to an example embodiment.

Detection evaluation system 108 may operate in various ways to evaluate security detections. For instance, detection evaluation system 108 may operate according to FIG. 2. FIG. 2 shows a flowchart 200 of a method for onboarding or rejecting security detections, according to an example embodiment. For illustrative purposes, flowchart 200 and detection evaluation system 108 are described as follows with respect to FIG. 3. FIG. 3 shows a block diagram of a system 300 for evaluating security detections, according to an example embodiment. As shown in FIG. 3, system 300 includes one example implementation of detection evaluation system 108. Detection evaluation system 108 includes a detection instance obtainer 302, an onboarding determiner 304, a detection onboarder 314, and a detection rejector 316. Detection instance obtainer 302 may be configured to obtain one or more detection instances 328 from a security detections pool 324. In examples, detection instance obtainer 302 may also be configured to query a detections database 326 to identify one or more security detections for which to obtain detection instances. Onboarding determiner 304 comprises a volume thresholder 306 and a detection performance evaluator 308. As shown in FIG. 3, detection performance evaluator 308 comprises a detection sampler 310 and an efficacy determiner 312. Detection onboarder 314 is configured to onboard security detections to a security monitoring platform 320. In some implementations, security monitoring platform may be coupled to an alerts pool 330 that may store one or more alerts associated with deployed and/or onboarded detections. Detection rejector 316 comprises a rejection notifier, and is configured to transmit a rejection notification 322, such as a notification to an author of the rejected security detection. Flowchart 200 and system 300 are described in further detail as follows.

Flowchart 200 of FIG. 2 begins with step 202. In step 202, one or more detection instances are obtained for a detection that meets a predetermined criterion. For instance, with reference to FIG. 3, detection instance obtainer 302 is configured to obtain detection instances 328 from security detections pool 324. In example embodiments, security detections pool 324 may comprise one or more data stores, including but not limited to a database, a spreadsheet, a file, a digital document, a repository, etc. that identifies detection instances 328. Security detections pool 324 is not limited to any particular format for identifying detection instances 328, and may include a listing, a table, an event log, etc.

In implementations, detection instances 328 may be generated for one or more detections. A detection may comprise an algorithm, process, software, service, source code in one or more programming languages, etc. configured to detect certain types of activity that may, individually or collectively, resemble or otherwise be indicative of abnormal or malicious behavior in a computing environment. In some example embodiments, a detection may be configured to detect potentially abnormal or malicious network activity. A detection may be configured to execute on a single computing device (such as on a server that may monitor network 110, or on an end-user computer), distributed across multiple computing devices, or on software or a service executing on the cloud. Individual detections may be deployed for a variety of products and/or services, such as anti-virus and/or anti-malware packages, network security and/or monitoring tools (e.g., for monitoring domain controllers, firewall behaviors, or the like), cloud-based services, locally installed software packages (e.g., word processing, web browsing, etc.), or any software or service that may be coupled to, or access network traffic data (such as from network traffic logs or event logs) of network 110 or any of the resources coupled thereto. Accordingly, in implementations, detection instances 328 may be generated for a plurality of products and/or services for which detections are deployed.

Detection instances 328 may comprise an occurrence of one or more types of activity in a computing environment as a particular detection. For instance, detection instances 328 may indicate the presence of potentially abnormal or malicious behavior for each such deployed detection. Abnormal or malicious behavior may comprise any type of behavior in a computing environment, including but not limited to a local computing device, a virtual machine, a collection of computing devices (e.g., a plurality of servers), one or more networks, etc. For instance, upon detecting potentially abnormal or malicious behavior, a detection may generate one or more detection instances 328 for the detection that identifies, among other things, an affected resource, a geographic location of the affected resource, a location of the affected resource (e.g., where on a network an attack may have occurred), an affected service (e.g., a cloud-based or enterprise service that may have been attacked), a customer name or identifier associated with the detected activity, a date and/or time of the detected activity, the type of detected activity (including any metadata or event logs associated with the detected activity), and/or any other information associated with the detected activity. Each of detection instances 328, upon generation, may be identified and/or stored in security detections pool 324.

In examples, detections database 326 may comprise a database or a catalog that identifies the one or more security detections that may be in progress or deployed on network 110, such as security detections that are generating detection instances 328. In some examples, detections database 326 may comprise a master listing, or the like, of detections in progress or deployed across network 110 that may be queried. Detections database 326 may identify each security detection and details associated with each such detection. For instance, detections database 326 may indicate, for each security detection, a development stage (e.g. whether the detection is in progress or has been deployed), a state identifier (e.g., whether the detection is onboarded, rejected, or not yet onboarded or rejected), a detection type (e.g., detections configured to detect suspicious processes, bad users, etc.), a target of the detection (e.g., a software or service for which the detection operates and/or identification of the SOC to consume the detection), an author of the detection (which may also include a team or group), a length of time that detection instances have been generated, a number of detection instances generated over a predetermined time period, etc. In examples, when a new detection is deployed, a new entry may be stored in detections database 326 identifying the detection. In this manner, detections database 326 may comprise a catalog of each of the detections in progress or deployed across network 110 in a structured format.

It is noted, however, that detections database 326 need not be stored local to security detections pool 324, but may be stored remotely (e.g., on a different server or computing device), or may be distributed across several computing devices. Furthermore, although a single security detections pool and detections database is illustrated in FIG. 3, implementations are not so limited, and may include a plurality of security detections pools and/or detections database, such as a separate security detections pool and/or database for each one of a plurality of cloud-based services or the like provided on, or accessible by, any of the resources of network 110.

Detection instance obtainer 302 may be configured to obtain one or more detection instances 328 through execution of a query, or in any other suitable manner. In some examples, detection instance obtainer 302 may obtain detection instances for detections that meet a predetermined criterion, such as detections that have not been onboarded or rejected, and/or detections that have been generating detection instances for at least a threshold time period. An example flowchart for obtaining detections from a security detections pool is illustrated in greater detail with respect to FIG. 4, below.

In step 204, a determination is made whether the volume of the one or more detection instances is below a first threshold. For instance, with reference to FIG. 3, volume thresholder 306 of onboarding determiner 304 may be configured to determine whether a volume of obtained detection instances 328 for a given security detection is below a low threshold volume. The low threshold volume may comprise a threshold below which the volume of detection instances for a given security detection is sufficiently low such that the detection may be viable for monitoring. For example, if a particular detection has generated a number of detection instances below a low threshold amount, it may be inferred that the detection is not generating an excessive number of false-positive detection instances, and therefore the detection may be onboarded for full monitoring in a security monitoring platform. In example implementations, the low threshold volume may be configurable or modifiable in various ways, including but not limited to via a suitable user interface of computing device 106, via a configuration file modifiable by a user, a command-line interface or command language interpreter (CLI), a voice input, etc.

If volume thresholder 306 determines that the volume of detection instances 328 for a given detection is below the first threshold, the flow proceeds to step 206. If volume thresholder 306 determines that the volume of detection instances 328 for the detection is not below the first threshold, the flow proceeds to step 206.

In step 206, the detection is automatically onboarded to a security monitoring platform. For instance, with reference to FIG. 3, where volume thresholder 306 determines that the volume of detection instances 328 for a given detection is below the first threshold, detection onboarder 314 is configured to automatically onboard the detection to security monitoring platform 320. Security monitoring platform 320 may comprise any software and/or service configured to continuously monitor network activity based on one or more onboarded detections, and generate security cases for resolution when an onboarded detection detects potentially abnormal or malicious activity. In some examples, security monitoring platform 320 may provide a suitable interface (e.g., a graphical user interface) through which a security analyst (or a team of security analysts or other engineers in a SOC) may view generated cases along with information associated with each case (e.g., one or more alerts generated by the detection, the affected resource, the time of the detected activity, etc.). In some further examples, security monitoring platform 320 may also comprise an interface through which a security analyst may respond or resolve each case, such as marking the case as a false positive, marking the case as a true positive, performing one or more actions to remediate a potential or actual security vulnerability (e.g., blocking or filtering network traffic), etc.

In examples, alerts provided to security monitoring platform 320 may comprise one or more detection instances corresponding to an onboarded detection. In other words, once a detection is onboarded to security monitoring platform 320 for regular monitoring, security monitoring platform may ingest the generated detection instances as alerts from alerts pool 330. Accordingly, an alert may comprise any type of indication (e.g., a notification, a message, an entry in a log, an entry in a pool, etc.) indicating an occurrence of potentially abnormal or malicious activity as determined by an onboarded detection should be reviewed. In some example embodiments, security monitoring platform 320 may be configured to collect various alerts associated with one or more deployed and onboarded detections and group, correlate and/or stack such alerts together for resolution as a single security case, such as where one or more alerts occur on the same resource, around the same time, etc. In some other implementations, security monitoring platform 320 may also be configured to monitor activity in a computing environment via one or more deployed detections, generate cases for resolution, and route such cases to an appropriate security analyst or teams of analysts for resolution. For instance, if a generated case relates to a particular software or service, security monitoring platform 320 may be configured to identify an analyst responsible for the affected software or service, and route such a case to the responsible entity for resolution.

In yet some other examples, detection onboarder 314 may also be configured to update one or more state flags in detections database 326 corresponding to the detection. For example, where the detection has a state of neither onboarded nor rejected, detection onboarder 314 may cause detections database 326 to update the state flag to an "onboarded" state, which may enable detection instance obtainer 302 to ignore detection instances associated with the onboarded detection when executing the appropriate query. Detection onboarder 314 may also be configured to transmit a notification to the detection author indicating that the detection has been onboarded to security monitoring platform 320, along with other associated information (e.g., the number of detection instances generated over a certain period of time or other data related to the generated detection instances). Such a notification may enable the author to receive constructive feedback indicating that the detection has been accepted and being monitored during a normal course in security monitoring platform 320.

In step 208, a determination is made whether the volume of the one or more detection instances is above a second threshold. For instance, with reference to FIG. 3, volume thresholder 306 may be configured to determine whether the volume of detection instances 328 for a detection is above a high threshold volume. The high threshold volume may represent a threshold above which the volume of detection instances for a given security detection is excessively high such that the detection is likely to comprise a relatively large percentage of false positives and is therefore not viable for regular monitoring in security monitoring platform 320. For example, if a particular detection has generated a number of detection instances that exceeds the high threshold volume, it may be inferred that the detection is not accurately detecting potential security vulnerabilities on network 110, and should be rejected. In example implementations, similar to the low threshold volume, the high threshold volume may also be configurable or modifiable in various ways, including but not limited to a suitable user interface of computing device 106, a configuration file, a CLI, a voice input, etc.

If volume thresholder 306 determines that the volume of detection instances 328 for a given detection is above the second threshold, the flow proceeds to step 210. If volume thresholder 306 determines that the volume of detection instances 328 for the detection is not above the second threshold, the flow proceeds to step 212.

Figure 6:
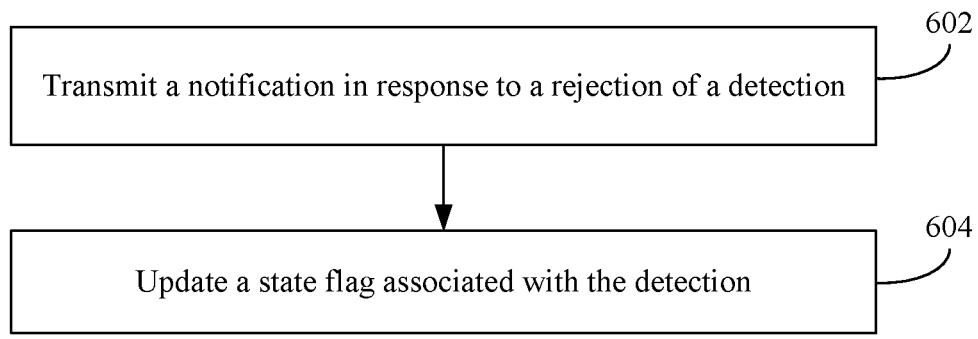
FIG. 6 shows a flowchart of a method for rejecting a security detection, according to an example embodiment.

In step 210, the detection is automatically rejected. For instance, with reference to FIG. 3, where volume thresholder 306 determines that the volume of detection instances 328 for a given detection is above the high threshold volume, detection rejector 316 may be configured to automatically reject the detection (i.e., prevent the detection from being onboarded onto security monitoring platform 320). In some example implementations, detection rejector 316 may also be configured to transmit a rejection notification 322 to an author of the detection indicating that the detection was rejected. An example flowchart describing the rejection of a detection is shown in FIG. 6, which is described in greater detail below.

In step 212, an efficacy of the detection is determined. For instance, with reference to FIG. 3, detection performance evaluator 308 may be configured to determine an efficacy of the detection where the volume of detection instances 328 is not below the first threshold and not above the second threshold. In other words, where the volume of detection instances 328 is between the low and high thresholds, detection performance evaluator 308 may be configured to determine an efficacy of the detection.

Figure 5:
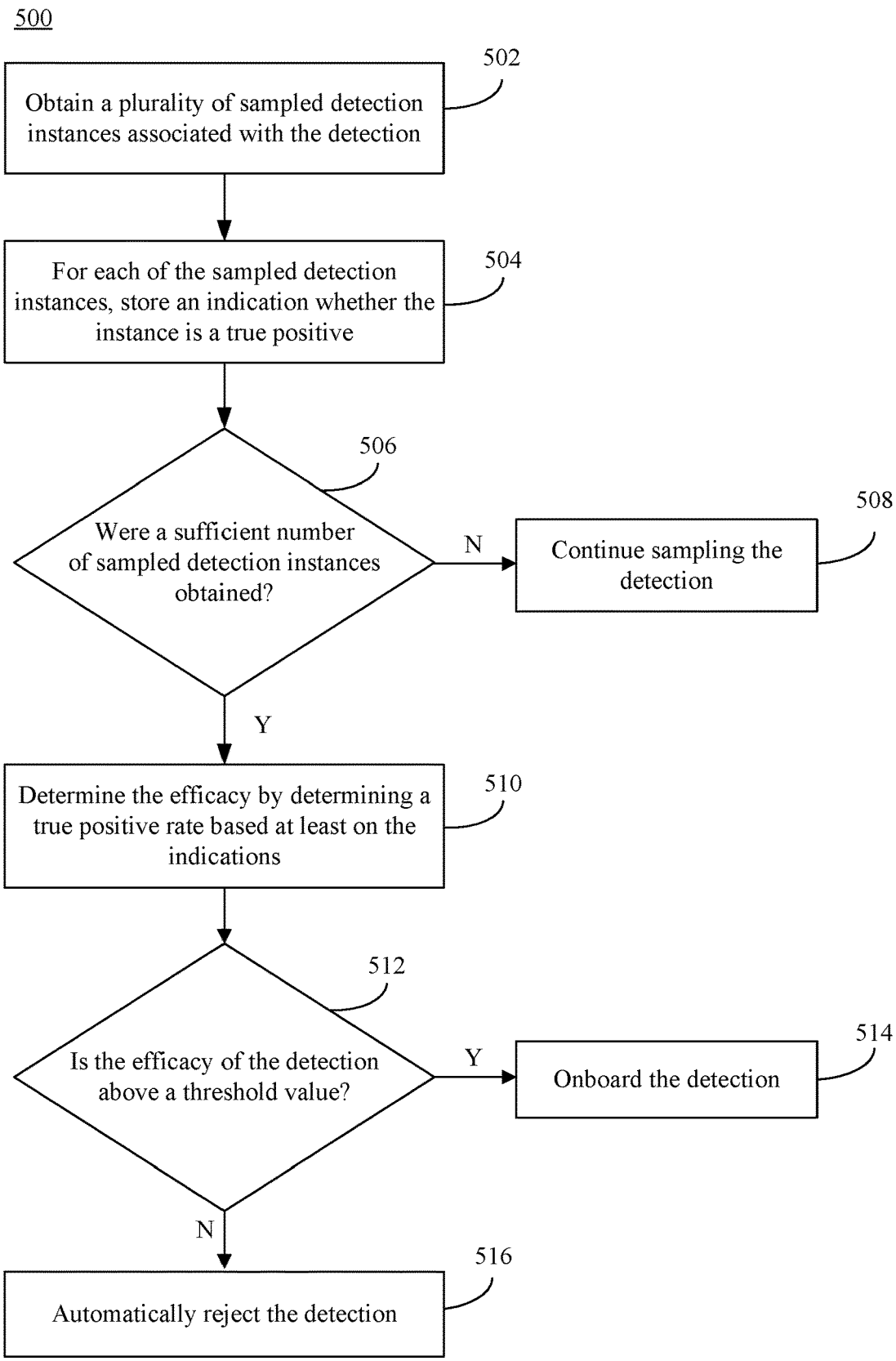
FIG. 5 shows a flowchart of a method for evaluating security detections based on an efficacy, according to an example embodiment.

Detection performance evaluator 308 may determine an efficacy of the detection in various ways. In one example, detection performance evaluator 308 may determine an efficacy based on a true positive rate associated with the detection. For instance, cases may be generated based on the detection in a similar manner as described above, and such cases may be resolved (e.g., in response to an interaction by a security analyst). Based on the resolution of the cases, a true positive (or a false positive) rate may be determined for the detection. An example flowchart an efficacy determination for a detection is shown in FIG. 5, which is described in greater detail below.

In step 214, the detection is onboarded or rejected based at least on the efficacy of the detection. For instance, with reference to FIG. 3, detection performance evaluator 308 may cause detection onboarder 314 to onboard the detection to security monitoring platform 320 or detection rejector 316 to reject the detection based at least on the efficacy (e.g., the true positive rate) of the detection. For instance, where the efficacy is above a threshold value (e.g., a desired efficacy), detection onboarder 314 may onboard the detection to security monitoring platform 320, and/or transmit a notification to an author of the detection indicating that the detection has passed one or more quality measures and is being fully monitored. In other instances, where the efficacy is not above a threshold value, it may be inferred that the detection comprises an excessive number of false positives and therefore cause detection rejector 316 to reject the detection.

In this manner, detections may be evaluated in accordance with the volume and/or efficacy desires (e.g., quality measures) of an SOC in advance of onboarding the detection to a security monitoring platform to increase the likelihood that the detection is generating instances in a manageable and sufficiently accurate way. By rejecting detections that do not pass the evaluation, the security monitoring platform need not ingest detection instances that generate an excessive number of false positives that may inefficiently utilize the limited resources of analysts in a SOC. Rather, meaningful, useful, and viable detections may be onboarded to the security monitoring platform in a repeatable and concise manner, enabling security analysts to better utilize such limited resources. Additionally, since aspects of the evaluation may be carried out in an automated fashion, analysts in the SOC may be enabled to better focus on resolving cases that are likely to identify legitimate threats rather than resolving an excessive number of cases as false positives. Furthermore, implementations described herein may be used to evaluate detections irrespective of which software or service the detection is associated (e.g., antivirus detections, antimalware detections, etc.).

Figure 4:
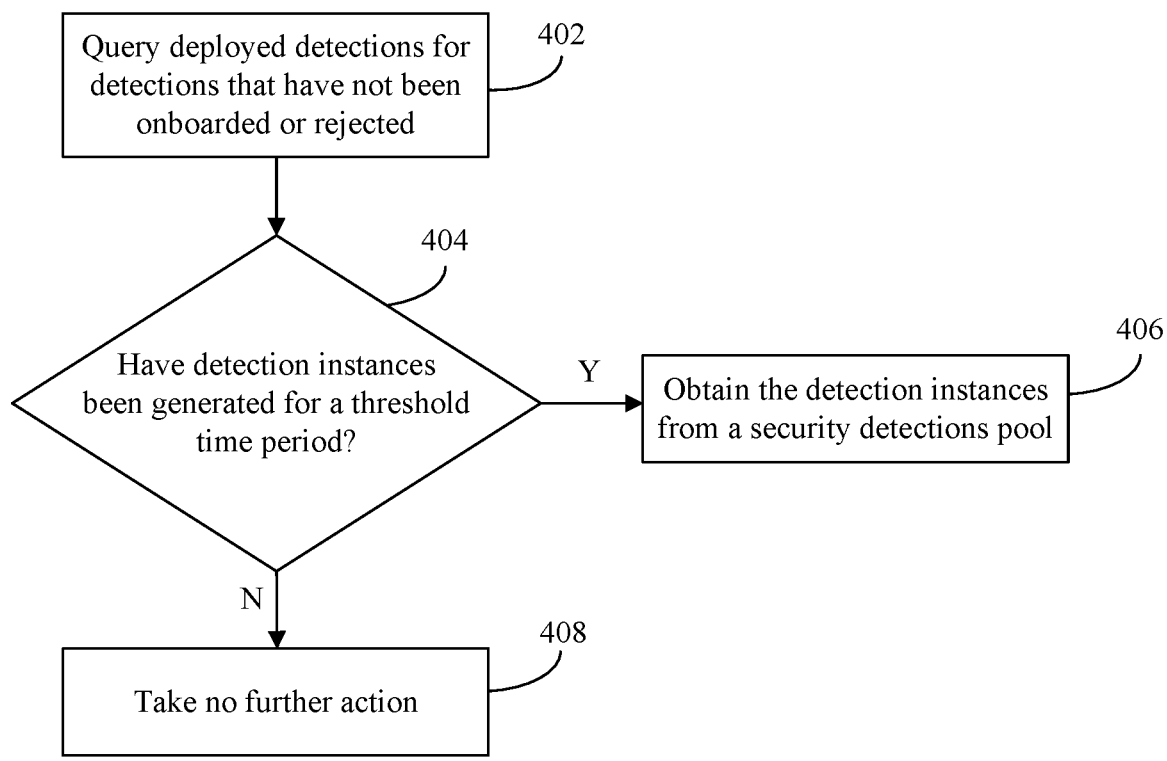
FIG. 4 shows flowchart of a method for obtaining detections from a detections pool, according to an example embodiment.

As described above, detection instance obtainer 302 may obtain detection instances from security detections pool 324 in various ways. For example, FIG. 4 shows a flowchart 400 of a method for obtaining detections from a detections pool, according to an example embodiment. In an implementation, the method of flowchart 400 may be implemented by detection instance obtainer 302. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, deployed detections are queried. For instance, detection instance obtainer 302 may be configured to execute one or more queries for detections database 326 to identify detections from security detections pool 324 for which detection instances should be obtained. In one example implementation, detection instance obtainer 302 may query detections database 326 to identify detections that are targeted to a particular SOC (in the event there are multiple SOCs implementing techniques described herein) and/or detections that comprise a certain state, such as detections that have not been onboarded or rejected. In other instances, if a particular detection is currently in progress or in development (i.e., not yet deployed), detection instance obtainer 302 may ignore such a detection when obtaining detection instances 328 from security detections pool 324. In yet another example, such as where a new detection is created and identified as deployed, detections database 326 may add a new entry in a catalog of detections along with an indication that the detection has been deployed, and an indication that the state of the detection is not onboarded or rejected. In this manner, detection instance obtainer 302 may readily identify, through an appropriate query or queries, detections that have been deployed but are not yet rejected or onboarded from detections database 326.

In some example embodiments, detection instance obtainer 302 may comprise a recurrent workflow or similar process configured to execute the one or more queries to query detections database 326 at predetermined time intervals. For instance, detection instance obtainer 302 may automatically execute one or more queries to identify deployed detections from detections database 326 that have not yet rejected or onboarded every 30 minutes, every hour, every 6 hours, each day, or any other interval that may be identified or configured for detection instance obtainer 302 through a suitable interface. In some other implementations, detection instance obtainer 302 may also execute such queries aperiodically (e.g., at random intervals) or in any other manner appreciated to those skilled in the art, such that detection instances 328 may be obtained in an ongoing fashion. In this fashion, detection instance obtainer 302 may identify, in a recurring manner, any newly deployed detections that are ready for evaluation (or any previously deployed detections that are ready for re-evaluation, as described in greater detail below).

In step 404, a determination is made whether detection instances for a detection have been generated for a threshold time period. For instance, with reference to FIG. 3, for a given detection that detection instance obtainer 302 has identified as not yet onboarded or rejected, it may be determined whether the detection has generated detection instances for a threshold time period. The threshold time period may comprise any time period in which a volume of detection instances may be evaluated to determine if the volume is excessive. In one example, the threshold time period may comprise a number of days, such as three days, although this number may be modified to suit the needs of any particular SOC, the overall size of security detections pool 324, the number of deployed detections, etc. (e.g., 1 day, 30 days, etc.).

In implementations, therefore, it may be determined whether detections that have not been onboarded or rejected have been generating instances for at least the threshold time period. As described above with respect to flowchart 200, if the volume of detection instances during such a time period is above a high threshold volume, it may be inferred that the detection is likely generating an excessive number of false positives, and therefore the detection may be rejected automatically. However, if the detection has not been generating any detection instances at all (e.g., no detections for at least the threshold time period), it may be inferred that a sufficient volume of detection instances is not available for evaluating the detection.

If a determination is made that detection instances have been generated for the threshold time period, the flow proceeds to step 406. If it is determined that the detection has not generated for the threshold time period, the flow proceeds to step 408.

In step 406, the detection instances for the detection are obtained from a security detections pool. For instance, with reference to FIG. 3, detection instance onboarder 302 may be configured to obtain one or more detection instances 328 from security detections pool 324 corresponding to the detection that has not yet been onboarded or rejected. In examples, step 406 may be performed in a substantially similar manner as described with respect to step 202 of flowchart 200. For example, upon obtaining detection instances 328, a volume of the detection instances during the threshold time period may be evaluated and automatically onboarded if the volume is below a low threshold and rejected if the volume is above a high threshold.

In step 408, no further action is taken. For instance, with reference to FIG. 3, deployed detections in may continue to monitor network traffic and generate detection instances. Since detection instance obtainer 302 may query detections database 326 on an ongoing basis as described earlier, if a particular detection subsequently generates detection instances for the predetermined time period, detection instance obtainer 302 may obtain the detection instances at the next query execution, thereby enabling detection evaluation system 108 to continuously evaluate deployed security detections.

As described above, detection performance evaluator 308 may be configured to determine an efficacy of a detection in some instances. For example, FIG. 5 shows a flowchart 500 of a method for evaluating security detections based on an efficacy, according to an example embodiment. In an implementation, the method of flowchart 500 may be implemented by detection sampler 310 and efficacy determiner 312. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, a plurality of sampled detection instances associated with a detection are obtained. For instance, with reference to FIG. 3, detection sampler 310 may be configured to obtain a sample of detection instances 328 corresponding to a particular detection identified by detection instance obtainer 302 (e.g., a detection that has not been onboarded or rejected and/or has generated detection instances for a threshold time period). In some examples, detection sampler 310 may obtain a random sampling of detection instances 328.

In some implementations, detection sampler 310 may generate one or more cases for evaluation based on a sample of alerts associated with the sampled detection instances. For instance, detection sampler 310 may generate cases for resolution in a case resolution platform based on a sample of detection instances 328 (including but not limited to a sample of alerts that may be generated from the sample of detection instances 328). In some example embodiments, detection sampler 310 may be configured to identify or submit a random subset of alerts to a case resolution platform based on a capacity parameter of the SOC that may indicate, among other things, a current capacity or workload of the SOC. For instance, where the SOC is operating with a reduced number of analysts, detection sampler 310 may reduce the number of alerts generated from sampled detection instances 328. In other instances, detection sampler 310 may increase the number of sampled alerts if the SOC has increased availability. In this manner, detection sampler 310 may dynamically modify the manner in which sampled alerts are provided to a case resolution platform, which may enable analysts to continue to devote suitable resources to formally monitored detections, while avoid being overburdened with evaluating cases for detections that are not formally onboarded.

In some implementations, the case resolution platform for ingesting sampled alerts may include security monitoring platform 320 described herein. For example, security monitoring platform 320 may provide, in each generated case, information associated with the case, such as the identification of one or more of alerts associated with sampled detection instances 328, a date and/or time the alerts were generated, the identity of the affected resource, the type of potential attack, or any other information or metadata associated with the one or more alerts or detection from which the alert was generated. In some examples, detection sampler 328 and/or security monitoring platform 320 may be configured to group or correlate one or more sampled alerts with other alerts (e.g., alerts generated from detection instances occurring close in time, occurring on the same resource, etc.). In other words, a single case may be associated with a plurality of alerts if a correlation exists between one or more of the alerts.

It is understood that although it is described herein that detection sampler 310 may be configured to obtain a sample of detection instances 328, implementations also include detection sampler 310 and/or security monitoring platform 320 obtaining security alerts from alerts pool 330 based on such detection instances. In other words, a sample of detection instances is not limited to detection instances obtained from security detection pool 324 but may also include obtaining one or more sampled alerts corresponding to such sampled detection instances from any other pool, such as alerts pool 330 that may be utilized by security monitoring platform 320 in some implementations. In examples, alerts stored in alerts pool 330 may store one or more security alerts that may be accessed by security monitoring platform 320 to generate security cases for evaluation. Similar to security detections pool 324, alerts pool 330 may comprise one or more data stores, including but not limited to a database, a spreadsheet, a file, a digital document, a repository, etc. and may comprise any suitable format for storing alerts, such as a listing, a table, an event log, etc.

Other actions may optionally be performed in response to sampling a given detection. For instance, a state flag associated with the detection in detections database 326 may also be updated in a suitable manner to indicate that the detection in being sampled for efficacy, although this is not required. In other examples, a notification may be transmitted to a detection author indicating that the detection has passed a volume check (if such a check was performed) and/or that the detection is being sampled for an efficacy.

In step 504, for each of the sampled detection instances, an indication is stored whether the detection instance is a true positive. For example, with reference to FIG. 3, security monitoring platform 320 may receive an input (e.g., a user input) in some example embodiments that a case generated for one or more sampled detection instances is a true positive or a false positive. In some implementations, a case resolution may be provided by a security analyst through a suitable interface of security monitoring platform 320. In some other implementations, security monitoring platform 320 may automatically determine and/or infer whether one or more of the sampled detection instances is a true or false positive. For instance, security monitoring platform 320 may identify whether the sampled instance is a true or false positive using one or more supervised or unsupervised machine-learning techniques (e.g., by identifying a similarly between a sampled case and a previously resolved case), analyzing metadata associated with the sampled detection instance and/or one or more correlated instances, or through any other automated process or semi-automated process (e.g., an automated process that may optionally include a user input) for marking the legitimacy of a potential security threat. In other words, security monitoring platform 320 may be configured to receive or automatically determine and/or infer an indication that a case was resolved as either a legitimate threat or a false positive.

Upon resolving a case through a user input and/or through an automated process, detection sampler 310 may be configured to store an indication that the detection instance was a false or true positive. Furthermore, since each sampled case may be associated with various detection instances (e.g., through correlation, stacking, etc.), detection sampler 310 may store the indication for each of the associated detection instances upon resolution of the case. For example, if a security analyst marks a particular case as a true positive, the true positive indication may be stored for each of the detection instances associated with that case.

In implementations, for each such case where a resolution is received or automatically determined, detection sampler 310 may store an indication, such as in a database coupled to detection sampler 310 and/or security monitoring platform 320, that the associated detection instance(s) are true positives or false positives. The indication need not be stored in a database, but may be stored in any other suitable manner, such as by tagging or flagging the detection instance, or otherwise including metadata in the detection instance indicating that it is a true or false positive.

In step 506, a determination is made whether a sufficient number of sampled detection instances was obtained. For instance, with reference to FIG. 3, detection sampler 310 may be configured to determine if a sufficient number of sampled detection instances was obtained. In some implementations, the sufficient number of samples may comprise a threshold value that may be predetermined and/or configurable via a suitable interface. For example, a sufficient sample size may comprise a number of samples sufficient to determine whether an efficacy of the detection (e.g., a measure of confidence that the detection is accurately detecting legitimate threats).

For instance, if the sampling size is configured as 20 samples, detection sampler 310 may continue to sample the detection until 20 detection instances have been resolved either as a true positive or a false positive. The detection instances can be sampled over any period of time. For example, 20 samples may be obtained and resolved in a single day, while in other examples it may take several days, weeks, or months to obtain and resolve 20 samples as either true or false positives. Furthermore, since resolution of any given case may have a plurality of associated sampled detection instances, the number of resolved cases may be less than the sample size (e.g., resolution of four cases may be sufficient to attain the sample size of 20 detection instances). It is noted, however, that a sample size of 20 is illustrative only, and may include any value, such as 5 samples, 10 samples, 100 samples, etc. based on the desires and operational capabilities of a given SOC.

If a sufficient number of sampled detection instances was not obtained, the flow proceeds to step 508. If a sufficient number of sampled instances was obtained, the flow proceeds to step 510.

In step 508, sampling of the detection is continued. For instance, with reference to FIG. 3, detection sampler 310 may be configured to continue sampling the detection (e.g., generate cases for evaluation based on generated detection instances), and store indications for each sampled detection instance that is identified as a true or false positive. In other words, the detection continues to be deployed (though not formally onboarded to a security monitoring platform) to detect potentially abnormal or malicious network activity until a number of samples (e.g., 20 samples) of detection instances have been identified as true or false positives sufficient to determine an efficacy of the detection, at which point the flow proceeds to step 510.

In step 510, an efficacy of the detection is determined by determining a true positive rate based at least on the indication. For instance, with reference to FIG. 3, efficacy determiner 312 may be configured to calculate a ratio of true (or false) positives to the total number of detection instances in the set of samples to determine an efficacy of the detection. Efficacy determiner 312 may determine such a true (or false) positive rate by querying each of the stored indications for the detection instances in the sample set. As an illustrative example, if a sample size comprised two sampled detection instances and only one was identified as a true positive, the efficacy of the detection is determined as having a 50% true positive rate. In another example, if no detection instances in the sample set were identified as a true positive, the detection would be considered to be 0% effective (i.e., that all of the detection instances in the sample set were false positives).

In step 512, it is determined whether the efficacy of the detection is above a threshold value. For instance, with continued reference to FIG. 3, efficacy determiner 312 may determine whether the efficacy (e.g., based on the true positive rate) of a given detection is above or equal to a threshold value. The threshold value may comprise any amount that represents a sufficiently high confidence value that the detection is detecting meaningful and useful network activity (e.g., legitimate threats that merit resolution by a security analyst). In other words, the threshold value can be configured to be any desired amount that represents a confidence that the detection is serving its intended purpose of detecting network threats.

In some implementations, the threshold value may be customizable for different types of detections. For instance, one type of detection (e.g., to detect unauthorized port scanning activities) may comprise a certain efficacy threshold value, while another type of detection (e.g., antivirus detections) may comprise a different efficacy threshold value. In examples, the efficacy threshold value for any given detection type (or all detections, if desired) may comprise any value, including a relatively low (e.g., 5%) or high (e.g., 60%, 90%, etc.) value, based on the desires and/or needs of the SOC implementing techniques described herein. For example, a SOC may choose a specific threshold value depending on whether the SOC desires to error on the side of caution by fully onboarding threats even with lower efficacies, or onboard detections that have relatively higher efficacy rates (or anything in between).

If the efficacy of the detection is above (or equal to) the threshold value, the flow proceeds to step 514. If not, the flow proceeds to step 516.

In step 514, the detection is onboarded. For instance, with reference to FIG. 3, if the efficacy of the detection is above the threshold value, as described in step 512, detection onboarder 314 may automatically onboard the detection to security monitoring platform 320, which may generate cases for evaluation based on the detection. In implementations, step 514 of flowchart 500 may be performed in a substantially similar as described with respect to step 206 of flowchart 200.

In step 516, the detection is automatically rejected. For instance, with reference to FIG. 3, if the efficacy of the detection is not above the threshold value (e.g., the detection is generating an excessive number of false positives), detection rejector 316 may automatically reject the detection. In implementations, step 516 of flowchart 500 may be performed in a substantially similar as described with respect to step 210 of flowchart 200. As a result, based at least on an efficacy determined from resolution of a plurality of sampled detection instances, detections with a high efficacy may be automatically onboarded, and detections with a low efficacy may be automatically rejected.

As described above, detection rejector 316 may reject a detection for failing to meet a volume and/or efficacy threshold in various ways. In examples, FIG. 6 is a flowchart of a method for rejecting a security detection, according to an example embodiment. In an implementation, the method of flowchart 600 may be implemented by detection rejector 316. FIG. 6 is described with continued reference to FIG. 3. Other structural and operational implementations will be apparent to persons skilled in the relevant art(s) based on the following discussion regarding flowchart 600 and system 300 of FIG. 3.

Flowchart 600 begins with step 602. In step 602, a notification is transmitted in response to a rejection of a detection. For instance, with reference to FIG. 3, in response to a rejection of a detection (e.g., as described with respect to step 210 of flowchart 200), rejection notifier 318 may be configured to transmit rejection notification 322 to an author of the detection. In examples, rejection notification 322 may comprise any suitable form and/or may be transmitted over any appropriate communication method, including but not limited to an email, a text message, a chat message, a message transmitted through a ticketing system, a notification stored in an error log or transmitted as a bug, a flag or other metadata associated with the detection or associated detection instances in security detection pool 324, etc.

For instance, if the volume of detection instances for a detection was excessive and/or the detection had an efficacy below a desired threshold, the detection may be rejected, and the author is notified of the rejection. In some implementations, the notification may indicate, in addition to identifying the rejected detection, a reason for the rejection (e.g., an excessive volume, an insufficient efficacy, etc.) and/or any other data related to the detection, detection instances, and/or rejection (e.g., details of the cases in which detection instances were marked as false positives). In this way, the author may receive a notification that not only indicates that the rejection may not be meaningful or viable, but may also comprise constructive feedback related to the rejection. As a result, the detection author may optionally review the notification to determiner whether the detection should be revised.

For instance, an author may implement a change to the detection to include one or more filtering or tuning techniques to more accurately detect abnormal or malicious network activity, may optionally redesign the detection in an attempt to reduce the number of false positives, or perform one or more modifications to improve the volume and/or efficacy of the detection. In some instances, the author may determine that the detection is not valuable in response to the rejection and delete the detection altogether. In other examples, the detection may be left unmodified, for instance, where the detection may nevertheless be useful for logging certain types of network behavior that may be beneficial for other purposes or may provide additional contextual information for other detections that are onboarded to security monitoring platform 320.

In step 604, a state flag associated with the detection is updated. For instance, with reference to FIG. 3, rejection notifier 318 may be configured to update a state flag associated with the detection that indicates that the detection was rejected. In examples, the state flag may comprise a flag or the like in detections database 326 as described previously that indicates whether the detection is onboarded or rejected. In the case where the detection is a new detection that was not previously onboarded or rejected, rejection notifier 318 may be configured to change update the flag to "rejected," or include any other indication that identifies the detection as being rejected. In some examples, detections database 326 may also be updated to identify, or reference, a reason associated with the rejection (e.g., an excessive volume of detection instances, an efficacy below a desired threshold, etc.).

As noted above, a detection author may, in some instances, modify a detection in response to receiving rejection notification 322. In such scenarios, the detection author may optionally request that the state flag indicating the detection was rejected be cleared or reset (e.g., through email, a ticketing system, etc.), such that the detection may be reevaluated. In some other implementations, the state flag may be cleared or reset by the author or automatically upon modifying the detection. In yet another implementation, the state flag may be reset after a predetermined or configurable time period (e.g., seven days) to enable the detection to generate new instances based on the revised logic. As described above, since detection instance obtainer 302 comprises an ongoing or recurrent workflow, detection evaluation system 108 may be configured to automatically reevaluate the modified detection instance at a subsequent time to determine whether to onboard or reject the detection.

As noted above, upon rejection of a detection, the detection may continue to monitor network activity across network 110 and generate detection instances 328 even though the detection has not been onboarded to security monitoring platform 320. However, in some other implementations, detection rejector 316 may also be configured to automatically pause or cease execution of certain detections upon rejection, such as where the detection may be generating an excessive volume of detection instances that may affect performance of network 110 or systems or services connected thereto, or detections that may be determined to not to serve any useful purpose, even if interpreted in context with other detection instances.

III. Example Mobile and Stationary Device Embodiments

Computing device 102, detection generation portal 104, computing device 106, detection evaluation system 108, server(s) 112, computing device(s) 114, security monitoring platform 320, security detections pool 324, detections database 326, alerts pool 330, flowchart 200, flowchart 400, flowchart 500, and/or flowchart 600 may be implemented in hardware, or hardware combined with software and/or firmware, such as being implemented as computer program code/instructions stored in a physical/hardware-based computer readable storage medium and configured to be executed in one or more processors, or being implemented as hardware logic/electrical circuitry (e.g., electrical circuits comprised of transistors, logic gates, operational amplifiers, one or more application specific integrated circuits (ASICs), one or more field programmable gate arrays (FPGAs)). For example, one or more of computing device 102, detection generation portal 104, computing device 106, detection evaluation system 108, server(s) 112, computing device(s) 114, security monitoring platform 320, security detections pool 324, detections database 326, alerts pool 330, flowchart 200, flowchart 400, flowchart 500, and/or flowchart 600 may be implemented separately or together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
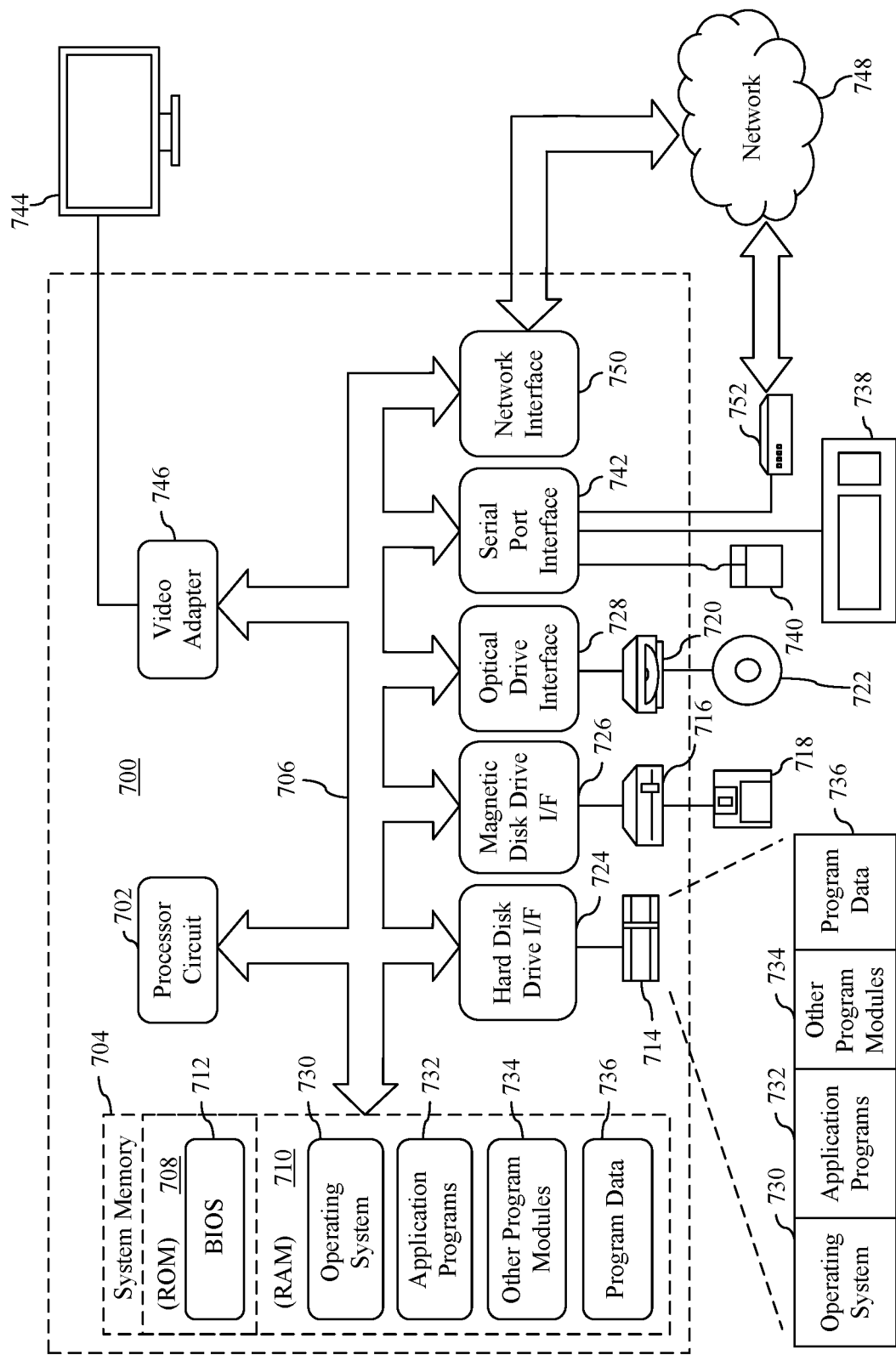
FIG. 7 shows a block diagram of an example computing device that may be used to implement example embodiments.

FIG. 7 depicts an exemplary implementation of a computing device 700 in which example embodiments may be implemented. For example, any of computing device 102, detection generation portal 104, computing device 106, detection evaluation system 108, server(s) 112, computing device(s) 114, security monitoring platform 320, security detections pool 324, detections database 326, and/or alerts pool 330 may be implemented in one or more computing devices similar to computing device 700 in stationary or mobile computer embodiments, including one or more features of computing device 700 and/or alternative features. The description of computing device 700 provided herein is provided for purposes of illustration, and is not intended to be limiting. Example embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing computing device 102, detection generation portal 104, computing device 106, detection evaluation system 108, server(s) 112, computing device(s) 114, security monitoring platform 320, security detections pool 324, detections database 326, alerts pool 330, flowchart 200, flowchart 400, flowchart 500, and/or flowchart 600 (including any suitable step of flowcharts 200, 400, 500, or 600) and/or further example embodiments described herein.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of example embodiments described herein. Accordingly, such computer programs represent controllers of the computing device 700.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

A system for evaluating security detections is disclosed herein. The system includes: one or more processors; and one or more memory devices that store program code configured to be executed by the one or more processors, the program code comprising: a detection instance obtainer configured to obtain one or more detection instances for a detection that meets at least one predetermined criterion; and an onboarding determiner configured to onboard or reject the detection, the onboarding determiner comprising: a volume thresholder configured to automatically onboard the detection if a volume of the obtained one or more detection instances is below a first threshold, and reject the detection if the volume is above a second threshold, and a detection performance evaluator configured to determine an efficacy of the detection if the volume is not below the first and not above the second threshold, and onboard or reject the detection based at least on the efficacy.

In one implementation of the foregoing system, the predetermined criterion comprises a determination that the detection has not been onboarded or rejected.

In another implementation of the foregoing system, the predetermined criterion comprises a determination that the one or more detection instances were generated for at least a threshold time period.

In another implementation of the foregoing system, the detection instance obtainer is configured to obtain the one or more detection instances from a security detections pool.

In another implementation of the foregoing system, the detection performance evaluator is configured to: obtain a plurality of sampled detection instances associated with the detection; and for each of the sampled detection instances, store an indication whether the sampled detection instance is a true positive.

In another implementation of the foregoing system, the detection performance evaluator is configured to: determine the efficacy of the detection by determining a true positive rate based at least on the indications for the sampled detection instances, and onboard the detection if the efficacy is above a third threshold, and reject the detection is the efficacy is not above the third threshold.

In another implementation of the foregoing system, the onboarding determiner comprises: a rejection notifier configured to transmit a notification to an author of the detection in response to a rejection of the detection.

In another implementation of the foregoing system, the rejection notifier is further configured to update a state flag associated with the detection that indicates that the detection was rejected.

In another implementation of the foregoing system, the onboarding determiner comprises: a detection onboarder configured to onboard the detection to a security monitoring platform that generates one or more security cases for evaluation based on the detection.

A method for evaluating security detections is described herein. The method includes: obtaining, from a security detections pool, one or more detection instances for a detection that meets at least one predetermined criterion, the detection being configured to detect security events in a networking environment; determining a volume of the one or more detection instances for the detection; in response to determining that the volume is below a first threshold, automatically onboarding the detection to a security monitoring platform that generates one or more security cases for evaluation based on the detection; and in response to determining that the volume is above a second threshold, automatically rejecting the detection and transmitting a notification to an author of the detection.

In one implementation of the foregoing method, the predetermined criterion comprises a determination that the detection has not been onboarded or rejected.

In another implementation of the foregoing method, the predetermined criterion comprises a determination that the one or more detection instances were generated for at least a threshold time period.

In another implementation of the foregoing method, the method further comprises: determining an efficacy of the detection if the volume is not below the first and not above the second threshold; and onboarding or rejecting the detection based at least on the efficacy.

In another implementation of the foregoing method, the determining the efficacy of the detection comprises: obtaining a plurality of sampled detection instances associated with the detection; for each of the sampled detection instances, storing an indication whether the sampled detection instance is a true positive; and determining the efficacy of the detection by determining a true positive rate based at least on the indications for the sampled detection instances.

In another implementation of the foregoing method, the notification comprises a reason associated with the rejection of the detection.

A computer-readable memory is disclosed herein. The computer-readable memory has computer program code recorded thereon that when executed by at least one processor causes the at least one processor to perform a method comprising: obtaining, from a security detections pool, a plurality of detection instances for a detection that meets at least one predetermined criterion, the detection being configured to detect security events in a networking environment; storing an indication, for each of the obtained detection instances, whether the detection instance is a true positive; determining a true positive rate of the detection based at least on the indications for the sampled detection instances, and automatically onboarding the detection to a security monitoring platform that generates one or more security cases for evaluation based on the detection if the true positive rate is above a threshold; and automatically rejecting the detection and transmitting a notification to an author of the detection if the true positive rate is not above the threshold.

In one implementation of the foregoing computer-readable memory, the predetermined criterion comprises a determination that the detection has not been onboarded or rejected.

In another implementation of the foregoing computer-readable memory, the predetermined criterion comprises a determination that the one or more detection instances were generated for at least a threshold time period.

In another implementation of the foregoing computer-readable memory, the method further comprises: determining a volume of the plurality of detection instances; in response to a determination that the volume is below a second threshold, automatically onboarding the detection; and in response to a determination that the volume is above a second threshold, automatically rejecting the detection and transmitting a notification to an author of the detection.

In another implementation of the foregoing computer-readable memory, the notification comprises a reason associated with the rejection of the detection.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system for evaluating security detections, the system comprising:
   one or more processors; and
   one or more memory devices that store program code configured to be executed by the one or more processors, the program code comprising:
      a detection instance obtainer configured to obtain one or more detection instances for a detection algorithm that meets at least one predetermined criterion, the detection algorithm comprising an algorithm for generating detection instances that include the one or more detection instances; and
      an onboarding determiner configured to onboard or reject the detection algorithm, the onboarding determiner comprising:
         a volume thresholder configured to automatically onboard the detection algorithm if a volume of the obtained one or more detection instances is below a first threshold, and reject the detection algorithm if the volume is above a second threshold, and
         a detection performance evaluator configured to determine an efficacy of the detection algorithm if the volume is not below the first and not above the second threshold, and onboard or reject the detection algorithm based at least on the efficacy.

2. The system of claim 1, wherein the predetermined criterion comprises a determination that the detection algorithm has not been onboarded or rejected.

3. The system of claim 1, wherein the predetermined criterion comprises a determination that the one or more detection instances were generated for at least a threshold time period.

4. The system of claim 1, wherein the detection instance obtainer is configured to obtain the one or more detection instances from a security detections pool.

5. The system of claim 1, wherein the detection performance evaluator is configured to:
   obtain a plurality of sampled detection instances associated with the detection algorithm; and
   for each of the sampled detection instances, store an indication whether the sampled detection instance is a true positive.

6. The system of claim 5, wherein the detection performance evaluator is configured to:
   determine the efficacy of the detection algorithm by determining a true positive rate based at least on the indications for the sampled detection instances, and
   onboard the detection algorithm if the efficacy is above a third threshold, and reject the detection algorithm if the efficacy is not above the third threshold.

7. The system of claim 1, wherein the onboarding determiner comprises:
   a rejection notifier configured to transmit a notification to an author of the detection algorithm in response to a rejection of the detection algorithm.

8. The system of claim 7, wherein the rejection notifier is further configured to update a state flag associated with the detection algorithm that indicates that the detection algorithm was rejected.

9. The system of claim 1, wherein the onboarding determiner comprises:
   a detection onboarder configured to onboard the detection algorithm to a security monitoring platform that generates one or more security cases for evaluation based on the detection algorithm.

10. A method for evaluating security detections, the method comprising:
    obtaining, from a security detections pool, one or more detection instances for a detection algorithm that meets at least one predetermined criterion, the detection algorithm comprising an algorithm to detect security events in a networking environment and generate detection instances that include the one or more detection instances;
    determining a volume of the one or more detection instances for the detection algorithm;
    in response to determining that the volume is below a first threshold, automatically onboarding the detection algorithm to a security monitoring platform that generates one or more security cases for evaluation based on the detection algorithm; and
    in response to determining that the volume is above a second threshold, automatically rejecting the detection algorithm and transmitting a notification to an author of the detection algorithm.

11. The method of claim 10, wherein the predetermined criterion comprises a determination that the detection algorithm has not been onboarded or rejected.

12. The method of claim 10, wherein the predetermined criterion comprises a determination that the one or more detection instances were generated for at least a threshold time period.

13. The method of claim 10, further comprising:
    determining an efficacy of the detection algorithm if the volume is not below the first and not above the second threshold; and
    onboarding or rejecting the detection algorithm based at least on the efficacy.

14. The method of claim 13, wherein said determining the efficacy of the detection algorithm comprises:
    obtaining a plurality of sampled detection instances associated with the detection algorithm;
    for each of the sampled detection instances, storing an indication whether the sampled detection instance is a true positive; and determining the efficacy of the detection algorithm by determining a true positive rate based at least on the indications for the sampled detection instances.

15. The method of claim 10, wherein the notification comprises a reason associated with the rejection of the detection algorithm.

16. A computer-readable memory having computer program code recorded thereon that when executed by at least one processor causes the at least one processor to perform a method comprising:
obtaining, from a security detections pool, a plurality of detection instances for a detection algorithm that meets at least one predetermined criterion, the detection algorithm comprising an algorithm to detect security events in a networking environment and generate detection instances that include the plurality of detection instances;
storing an indication, for each of the obtained detection instances, whether the detection instance is a true positive;
determining a true positive rate of the detection algorithm based at least on the indications for the detection instances;
automatically onboarding the detection algorithm to a security monitoring platform that generates one or more security cases for evaluation based on the detection algorithm if the true positive rate is above a threshold; and
automatically rejecting the detection algorithm and transmitting a notification to an author of the detection algorithm if the true positive rate is not above the threshold.

17. The computer-readable memory of claim 16, wherein the predetermined criterion comprises a determination that the detection algorithm has not been onboarded or rejected.

18. The computer-readable memory of claim 16, wherein the predetermined criterion comprises a determination that the one or more detection instances were generated for at least a threshold time period.

19. The computer-readable memory of claim 16, further comprising:
determining a volume of the plurality of detection instances;
in response to a determination that the volume is below a second threshold, automatically onboarding the detection algorithm; and
in response to a determination that the volume is above a second threshold, automatically rejecting the detection algorithm and transmitting a notification to an author of the detection algorithm.

20. The computer-readable memory of claim 16, wherein the notification comprises a reason associated with the rejection of the detection algorithm.

* * * * *